United States Patent Office 3,037,840
Patented June 5, 1962

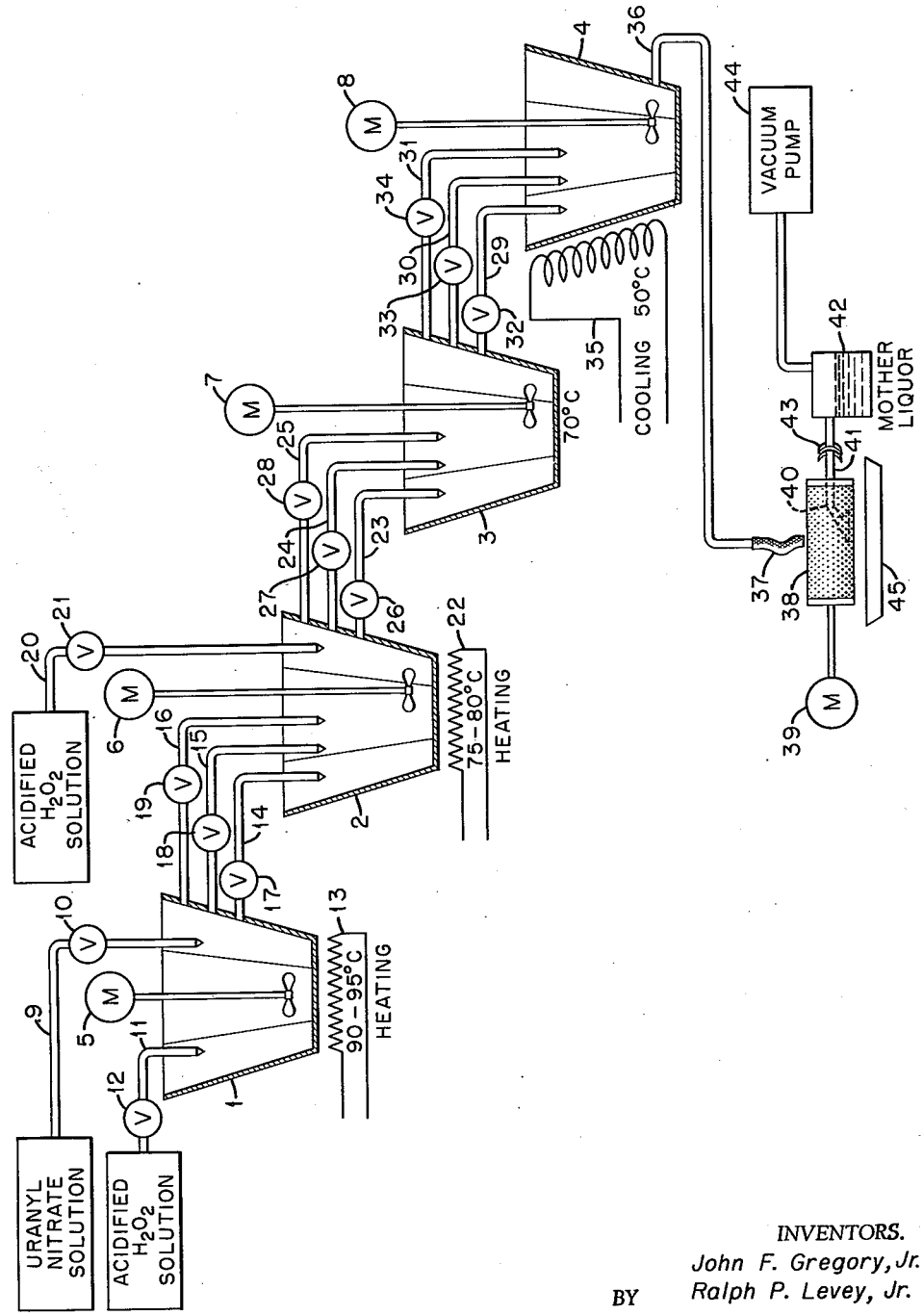

3,037,840
METHOD FOR PREPARATION OF SPHERICAL UO₄
John F. Gregory, Jr., and Ralph P. Levey, Jr., Oak Ridge, Tenn., assignors to the United States of America as represented by the United States Atomic Energy Commission
Filed Jan. 9, 1962, Ser. No. 165,265
9 Claims. (Cl. 23—14.5)

Our invention relates to the preparation of uranium oxides and more particularly to a method of precipitating uranium peroxide in the form of spherical particles.

One of the current nuclear reactor fuel requirements is for uranium oxides, and particularly $UO_2$, in the form of high-density, spherical particles. This material is utilized in dispersion-type fuel elements wherein the fissionable uranium oxide is disposed in a metallic matrix of plate-like configuration. This type fuel element may be fabricated by placing the uranium oxide between sheets of matrix material and rolling the material to cause it to flow around the oxide particles. Spherical particles are advantageous for dispersion-type fuel elements since particles of irregular shape tend to break or chip during rolling, resulting in the presence of stringers in the fabricated element. Spherical particles present the strongest possible geometry to minimize this tendency. Spherical particles are also advantageous for other uses such as in the preparation of ceramic compacts. These particles are easily transferred from stage to stage in a powder production process or in an intermediate process between the powder and a pressed compact. Spherical particles also may be compressed to a more uniform density than non-spherical particles.

Various methods have been employed for the preparation of spherical uranium oxide particles. For example, $UO_2$ spheres have been prepared by repeated sieving of non-spherical $UO_2$, by reduction of spherical $UO_3$ with hydrogen in a fluidized bed, by flame fusion of non-spherical $UO_2$ and by tumbling sinterable $UO_2$ powder in the presence of water. These methods are effective for preparing $UO_2$ within limited size ranges; e.g., particles within the range of about 80 to 400 microns in diameter may be prepared by the tumbling method. A continuing need has existed for a convenient method of preparing smaller $UO_2$ particles within the range of 10 to 25 microns in diameter. Spherical particles of this size are desired for use in dispersion-type fuel elements.

Uranium oxides have been prepared previously by precipitating uranium peroxide and heating the precipitate, but the oxides prepared in this manner have not been in the form of spherical particles. The peroxide is precipitated by addition of hydrogen peroxide to a uranyl ion-containing solution. The precipitate is recovered and converted to oxide by heating, with the oxide chemical composition depending upon the temperature and atmosphere employed in the heating step. In the peroxide precipitation methods previously employed the precipitate has been in the form of needle-like crystals or crystal agglomerates of irregular shapes. Formation of spherical $UO_4$ hydrate particles which produce spherical oxide particles upon being heated has not been effected by this method. Adaptation of this method to the precipitation of spherical $UO_4$ particcels in a continuous method suitable for preparation of large quantities of spherical oxide particles is desired.

It is, therefore, an object of our invention to provide a method of precipitating uranium peroxide in the form of spherical particles.

Another object is to provide a method of continuously precipitating spherical uranium peroxide particles.

Another object is to provide a method of preparing uranium oxides in the form of spherical particles.

Another object is to provide a method of preparing uranium dioxide in the form of spherical particles 10 to 25 microns in diameter.

Other objects and advantages of our invention will be apparent from the following detailed description and claims appended hereto.

In accordance with our invention uranium peroxide is continuously precipitated in the form of spherical particles by continuously contacting a uranyl nitrate solution having an initial pH of 2.5 to 3.1 with a nitric acid-containing hydrogen peroxide solution in a plurality of reaction zones. In the first reaction zone seed crystals are formed by supplying 5 to 20 percent of the stoichiometric amount of hydrogen peroxide required for a complete reaction with the uranyl ions at a temperature of 85° C. to 95° C. The resulting seeded solution is continuously removed after a mean residence time of 2 to 5 minutes. The seeded solution is then contacted with nitric acid-containing hydrogen peroxide solution in a second reaction zone under the following conditions: ratio of hydrogen peroxide to uranium, at least 7 to 1; ratio of nitric acid to uranium, 1.0 to 1 to 1.5 to 1; and temperature, over 50° C., preferably 75° C. to 80° C. The resulting reaction mass may then be passed through a hold-up zone or a series of hold-up zones at a temperature over 50° C. to allow further growth of spheres. The flow rate through the second and succeeding zones is adjusted to provide an overall mean residence time, including the first zone residence time, of 5 to 11 minutes. The effluent slurry is then cooled and the spherical particles contained therein are rapidly separated from the mother liquor. Vigorous agitation is provided in each of the reaction and hold-up zones. The spherical $UO_4$ particles are dried and converted to oxide by heating. This method is particularly effective for the preparation of spherical particles of $U_3O_8$ and $UO_2$ within the size range of 10 microns to 25 microns in diameter. The continuous precipitation step allows the use of this method for producing large quantities of material.

Although our invention is not to be understood as limited to a particular theory, it is postulated that the $UO_4$ is precipitated as fine needles, e.g., 1 micron by 5 microns in size, and that the needles form spherical agglomerates under the specific process conditions employed. Control of numerous reaction conditions within critical limits is required for formation of spherical particles, as will be described below.

Seeding is effected by continuously introducing an aqueous uranyl nitrate solution and an acidified hydrogen peroxide solution into a thoroughly agitated reaction zone. The initial pH of the uranyl nitrate solution is critical to the method of our invention. A pH within the range of approximately 2.5 to 3.1 may be employed and a pH of 3.0 is preferred. The concentration of uranyl nitrate may be varied within the range of approximately 50 to 120 grams uranium per liter. It is preferred to control the uranium concentration by maintaining the specific gravity of the solution at a constant value of approximately 1.07, which corresponds to a concentration of 60 grams uranium per liter. The pH of the uranium solution may be increased to the desired level by addition of an aqueous ammonium hydroxide solution. The uranium-bearing solution and a nitric acid-containing hydrogen peroxide solution are continuously introduced in a proportion sufficient to provide 5 to 20 percent, and preferably 10 to 15 percent, of the stoichiometric amount of peroxide required for a complete reaction with the uranyl ion. The initial concentration of hydrogen peroxide in the influent acidified peroxide solution is not critical, but about 2 to 3 molar is preferred in order to provide a convenient volume of reagent solution. The concentration of nitric acid in the peroxide solution is likewise not critical, but a concentration of about 0.3 molar is preferred. The resulting agitated mixture is continuously removed after a mean residence time within the range of 2 to 5 minutes, this period being critical to the formation of seed crystals. The temperature in the first reaction zone is maintained at a value of at least 85° C., and preferably 90° C. to 95° C. At higher temperatures the peroxide is excessively decomposed.

The resulting seeded solution is then continuously introduced into a second reaction zone together with an excess amount of acidified hydrogen peroxide solution. The reagent streams in this step are introduced at relative proportions such that the ratio of hydrogen peroxide to uranium in the resulting mixture is at least 7 to 1, and preferably about 10 to 1, and the ratio of nitric acid to uranium is within the range of 1.0 to 1 to 1.5 to 1. The temperature of the reaction zone in this step is maintained at 50° C. to the boiling point (slightly less than 100° C.), and preferably 75° C. to 80° C. The reaction zone in this step is also thoroughly agitated. The resulting mixture is continuously removed after a mean residence time of at least approximately 1 minute and not exceeding the time required for an overall process residence time of 11 minutes. The resulting mixture contains $UO_4$ in the form of spherical particles which may be separated from the mother liquor at this point and converted to oxide form. Further growth of spherical particles may be obtained, however, by passing the mixture through at least one, and preferably a series of two to three, hold-up zones prior to separation of the particles. No further amounts of fresh reagents are introduced into the hold-up zones. The temperature in the hold-up zones is maintained above 50° C., and preferably 75° C. to 80° C. The flow rate of the resulting mixture through the second reaction zone and hold-up zones is adjusted to provide an overall mean residence time, including the residence time in the first zone, within the range of 5 to 11 minutes. Further contact of the particles with the mother liquor under these conditions results in deterioration of the spherical particles.

The effluent mixture from the second reaction zone or from the last hold-up zone where hold-up zones are employed is then filtered rapidly to recover the spherical particles. Although not critical, it is preferred to cool the mixture to a temperature below about 50° C. prior to filtration to increase the strength of the particles. This may be accomplished by continuously passing the mixture through a vessel provided with conventional cooling coils.

Separation of the particles from the mother liquor must be effected rapidly and in a manner such that the separated particles are not again brought into contact with the mother liquor. It is preferred to employ a perforated metal filter of rotary drum configuration, with a pick-up arm being provided within the drum for removal of the mother liquor by means of a vacuum. The drum is rotated in a horizontal position, and the precipitate slurry is poured on the top of the rotating drum. Particles precipitated as described above are highly filterable and application of a vacuum readily removes the mother liquor. The separated particles are periodically scraped from the drum into a tray or other container.

Drying of the separated particles is effected by heating, preferably to a temperature of 250° C. to 300° C. in air. In order to preserve particle integrity the particles are spread out thinly during this step.

The resulting dried particles are in the form of partially dehydrated $UO_4$. Conversion to $U_3O_8$ is effected by heating the $UO_4$ to a temperature of at least 350° C. In order to strengthen and densify the particles it is preferred to fire the $U_3O_8$ to a temperature of at least approximately 700° C. Particle integrity is enhanced by heating the $UO_4$ at a rapid rate, e.g., to 950° C. in a period of 1 to 3 seconds. The $U_3O_8$ may then be converted to $UO_2$ by previously known methods such as heating the $U_3O_8$ to a temperature of at least 1200° C. in the presence of hydrogen. In order to avoid agglomeration of the $UO_2$ particles, it is preferred to first heat the particles to 800° C. and then to sieve the particles prior to heating them to 1200° C. The resulting $UO_2$ is in the form of spherical particles largely within the size range of 10 to 25 microns in diameter.

The size of the spherical particles may be varied by adjustment of process conditions within the specified ranges. Particle growth is increased by allowing longer residence times, particularly in the first reaction zone wherein seeding is effected. Larger amounts of hydrogen peroxide in this step result in decreased particle size.

The method of our invention is effective for lots of material which can be passed through reaction zones of up to 8 to 10 liters in volume within the required residence times. Attainment of sufficient homogeneity presents difficulty in larger reaction zones. The use of a series of 2 to 3 hold-up zones, described above as an alternative procedure, is particularly recommended for large amounts of material since mixing is effected more efficiently in small containers than in a larger single container.

A schematic representation of apparatus preferred for carrying out the method of our invention may be seen by reference to the accompanying figure. The reaction of a uranyl nitrate solution with hydrogen peroxide solution is effected in a series of reaction vessels, 1, 2, 3 and 4. To provide maximum mixing each of the vessels is of hexagonal configuration with outwardly tapered walls. Each vessel is provided with a conventional electrically actuated mechanical agitator 5, 6, 7 and 8. A uranyl nitrate solution is continuously introduced into vessel 1 through a line 9 provided with a valve 10. A nitric acid-containing hydrogen peroxide solution is continuously introduced through line 11 provided with a valve 12. Vessel 1 is maintained at a temperature of 90° C. to 95° C. by means of a conventional heating element 13. Removal of the reaction mixture from vessel 1 is effected by overflow lines 14, 15 and 16 provided with valves 17, 18 and 19, respectively. The volume of reaction mixture in vessel 1 is controlled by alternatively opening valve 17, 18 or 19 at the level desired. Vessel 2 is spaced below overflow lines 14, 15 and 16 to allow the reaction mixture to flow into vessel 2 by gravity. Further amounts of hydrogen peroxide solution are introduced into vessel 2 by means of line 20 provided with a valve 21. Vessel 2 is maintained at a temperature of 75° C. to 80° C. by means of a conventional heating element 22. The reaction mixture is removed from vessel 2 by means of vertically spaced overflow lines 23, 24 and 25 provided with valves 26, 27 and 28, respectively. The volume in vessel 2 is adjusted by selection of a line at the level desired in the same manner as for vessel 1. The resulting reaction mixture flows by gravity from vessel 2 into vessel 3, which is spaced below vessel 2. The reaction mixture is removed from vessel 3 through overflow lines 29, 30 and 31 provided with valves 32, 33 and 34, respectively. No external heat is supplied to vessel 3, the temperature of the previously heated reaction mixture being decreased to about 70° C. in the vessel. The volume of reaction mixture in vessel 3 is controlled by selection of a line at the desired level in the same manner as for vessels 1 and 2. The reaction mixture flows by gravity into vessel 4 which is spaced below vessel 3. The reaction mixture is cooled to a temperature of 50° C. in vessel 4 by means of conventional cooling coils 35. The reaction mixture is removed from vessel 4 througn a single outlet line 36 spaced near the bottom of vessel 4. The reaction mixture is conducted through line 36 and a flexible hose 37 to a filter 38. The filter 38 comprises a hollow, perforated metal cylinder whose walls comprise a filtering medium. The filter is rotated by means of a conventional variable-speed electric motor 39. Solution passing through the cylinder wall is removed through a pick-up arm 40 and conducted by line 41 to a collecting tank 42. Line 41 is provided with a flexible ball joint 43 to allow rotation of line 41. Removal of mother liquor is effected by means of a vacuum pump 44. The $UO_4$ precipitate which accumulates on the filter is periodically removed and collected in tray 45.

Spherical $UO_4$ particles may also be formed in a batch precipitation operation. Batch precipitation is useful for laboratory-scale preparation of small quantities of material, but is not practical for large-scale use. In batch precipitation the composition of the reagent streams is the same as for continuous precipitation, namely, uranyl nitrate solution with a pH of 2.5 to 3.1, 3.0 being preferred, and a uranium concentration of 50 to 120 grams per liter and nitric acid-hydrogen peroxide solution at a concentration of about 2 to 3 molar hydrogen peroxide and 0.3 molar nitric acid. Seeding is effected by slowly adding approximately 10 percent of the stoichiometric amount of nitric acid-containing hydrogen peroxide solution to the uranyl nitrate under conditions of vigorous agitation and at a temperature of at least 75° C. and preferably 90° C. to 95° C. The resulting solution is then aged under these conditions for a period of 5 to 7 minutes, whereby a haze of precipitate nuclei is formed. Further amounts of hydrogen peroxide are than added slowly, and preferably dropwise, to the agitated solution until the following reactant ratios are obtained: ratio of hydrogen peroxide to uranium, at least 7 to 1 and preferably about 10 to 1; ratio of nitric acid to uranium, 1.0 to 1 to 1.5 to 1. The temperature is maintained above 75° C., and preferably from 90° C. to 95° C. Formation of spherical particles is effected by this means within a period of 20 to 30 minutes. Upon formation of spheres the mixture is filtered rapidly to separate the spheres from the mother liquor. Prolonged contact of the spheres with the mother liquor results in degradation of the spheres. The spherical particles are then converted to oxide form in the same manner as for continuous-precipitated material. Batch precipitation as described herein is effective for lots of material up to a total mass of reactant solution of about 4 liters. With larger quantities of material the reacting system fails to reach equilibrium and irregular particles are produced.

Our invention is further illustrated by the following specific examples.

*Example I*

Uranium peroxide was continuously precipitated in the form of spherical particles by means of the following procedure: A uranium feed solution was prepared by dissolving uranium metal chips in concentrated nitric acid, filtering the solution, diluting to a specific gravity of 1.075 and adjusting the pH to a value of 3.1 by addition of ammonium hydroxide solution. The uranium concentration of the solution was 51 grams per liter. Acidified hydrogen peroxide solution was prepared by mixing 25 liters of 30 weight percent hydrogen peroxide with 1.8 liters of concentrated nitric acid and diluting to a volume of 25 gallons. Reaction of the two solutions was carried out in the apparatus described above with reference to the accompanying figure, except that no hold-up zone (vessel 3) was employed. The uranium-containing solution was introduced into the first vessel at a flow rate of 570 cubic centimeters per minute and the hydrogen peroxide solution was introduced at a flow rate of 130 cc. per minute. The volume of the first vessel was maintained at a level of 2900 cubic centimeters and the mean residence time of the resulting mixture in this vessel was 4.1 minutes. The temperature of the first vessel was maintained at 93° C. The resulting mixture overflowed to the second vessel, and further hydrogen peroxide solution was introduced at a flow rate of 800 cc. per minute. The volume of the second vessel was maintained at a level of 1485 cubic centimeters and the mean residence time of the resulting mixture in this vessel was 1 minute. The temperature of the second vessel was also maintained at 93° C. The overflowing mixture from the second vessel was cooled to 50° C. and was rapidly filtered on the rotary vacuum filter described above. The filter cake was then lightly broken up and dried by heating to 93° C. in air. The dried precipitate was in the form of spherical particles of $UO_4$. The size distribution of the resulting particles was determined by means of an instrument available commercially under the trade name "Sharples Micromerograph" (Model AW). This instrument was operated at a pressure of 200 pounds per square inch and a slit opening of 250 microns. The average particle size was 10 microns. 90 percent of the particles were larger than 2 microns in diameter and 90 percent were smaller than 35 microns in diameter. The particles were examined visually by means of a microscope and found to be of spherical configuration. The $UO_4$ was then converted to $U_3O_8$ by rapidly heating to a temperature of 900° C. in air. The $U_3O_8$ was also in the form of spherical particles. The average particle size as determined by measurement with the above-mentioned instrument was 19 microns, 90 percent of the particles being larger than 5 microns and 90 percent being smaller than 28 microns. The surface area of the $U_3O_8$ was 0.42 square meter per gram.

*Example II*

Batch precipitation of $UO_4$ spherical particles was effected in the following manner: A uranyl nitrate solution containing 56.7 grams uranium per liter was adjusted to pH 3.0 by addition of ammonium hydroxide. An acidified hydrogen peroxide solution was prepared by diluting 526 milliliters of 30 weight percent hydrogen peroxide and 38.6 milliliters of 70 weight percent nitric acid with water to 2 liters. Two liters of the uranium solution was heated to 100° C. in a 4-liter beaker and 20 milliliters of peroxide solution was added dropwise through a separatory funnel spout. The resulting solution was continuously agitated by a conventional agitator and was allowed to age for a period of 5 minutes, whereby a haze of precipitant nuclei was formed. The remainder of the peroxide solution was added dropwise during the next 30 to 40 minutes. The temperature of the resulting mixture was maintained above 75° C. The precipitate was then removed by filtration, washed with 500 milliliters of distilled water and air-dried on the filter. The filter cake was broken up by light grinding and the resulting spherical particles were converted to $U_3O_8$ by heating to 900° C. As determined by measurement with the instrument mentioned in Example I, the particle size of 50 percent of the particles was within the range of 10 to 25 microns in diameter and 50 percent of the particles were less than 10 microns in diameter. One physical properties of the $U_3O_8$ particles were as follows: tap density, 1.74 grams per cc.; helium displacement density, 8.62 grams per cc.; and surface area, 0.44 square meter per gram.

A portion of the $U_3O_8$ was then fired to 1825° C. in a helium atmosphere to produce spherical particles of $UO_2$. The particle size of the resulting $UO_2$, as determined by measurement with the above-mentioned instrument, was 22 percent less than 10 microns in diameter and the balance within the range of 10 to 22 microns in diameter. The tap density of the $UO_2$ was 2.76 grams per cc. and surface area 0.27 square meter per gram.

The above examples are merely illustrative and are not to be construed as limiting in any way the scope of our invention. It is to be understood that variations in apparatus and procedure may be employed by one skilled in the art without departing from the scope of our invention and that our invention is limited only as indicated by the appended claims.

Having thus described our invention, we claim:

1. The method of preparing uranium peroxide in the form of spherical particles which comprises continuously introducing an aqueous uranyl nitrate solution having a pH of 2.5 to 3.1 and a nitric acid-containing aqueous hydrogen peroxide solution into a first reaction zone at a relative proportion such that the amount of hydrogen peroxide is within the range of approximately 5 to 20 percent of the stoichiometric amount required for complete reaction with the uranyl ion in said uranyl nitrate solution and at a rate such that the mean residence time of the resulting mixture in said first reaction zone is within the range of approximately 2 to 5 minutes, maintaining said first reaction zone at a temperature of 85° C. to 95° C., continuously removing the resulting seed-containing solution from said first reaction zone, continuously contacting said seed-containing solution with further amounts of nitric acid-containing hydrogen peroxide solution in a second reaction zone at a relative proportion such that the resulting ratio of hydrogen peroxide to uranium is at least 7 to 1 and the resulting ratio of nitric acid to uranium is within the range of approximately 1.0 to 1 to 1.5 to 1, said second reaction zone being maintained at a temperature above 50° C., continuously removing the resulting precipitate-containing slurry from said second reaction zone, the volume of said second reaction zone and the flow rate of said slurry being adjusted to provide an overall mean residence time of said resulting mixture in said zones within the range of 5 to 11 minutes, and rapidly separating the resulting spherical particles from the remaining mother liquor, each of said zones being maintained in a state of vigorous agitation.

2. The method of claim 1 wherein the temperature of said first reaction zone is maintained within the range of 90° C. to 95° C.

3. The method of claim 1 wherein the initial pH of said uranyl nitrate solution is approximately 3.0.

4. The method of claim 1 wherein the ratio of hydrogen peroxide to uranium in said second reaction zone is approximately 10 to 1.

5. The method of claim 1 wherein the resulting spherical particles are heated to a temperature of at least 350° C.

6. The method of claim 1 wherein the resulting spherical particules are heated to a temperature of at least 1200° C. in a reducing atmosphere.

7. The method of preparing uranium peroxide in the form of spherical particles which comprises continuously introducing an aqueous uranyl nitrate solution having a pH of 2.5 to 3.1 and a nitric acid-containing aqueous hydrogen peroxide solution into a first reaction zone at a relative proportion such that the amount of hydrogen peroxide is within the range of approximately 5 to 20 percent of the stoichiometric amount required for complete reaction with the uranyl ion in said uranyl nitrate solution and at a rate such that the mean residence time of the resulting mixture in said first reaction zone is within the range of approximately 2 to 5 minutes, maintaining said first reaction zone at a temperature of 85° C. to 95° C., continuously removing the resulting seed-containing solution from said first reaction zone, continuously contacting said seed-containing solution with further amounts of nitric acid-containing hydrogen peroxide solution in a second reaction zone at a relative proportion such that the resulting ratio of hydrogen peroxide to uranium is at least 7 to 1 and the resulting ratio of nitric acid to uranium is within the range of approximately 1.0 to 1 to 1.5 to 1, said second reaction zone being maintained at a temperature above 50° C., continuously removing the resulting precipitate-containing slurry from said second reaction zone, continuously passing said slurry through at least one hold-up zone at a temperature above 50° C., the volume of said second reaction zone and said hold-up zone and the flow rate of said slurry being adjusted to provide an overall mean residence time of said resulting mixture in said zones within the range of 5 to 11 minutes, continuously removing said slurry from said hold-up zone, cooling said slurry to a temperature below 50° C. and rapidly separating the resulting spherical particles from the remaining mother liquor, each of said zones being maintained in a state of vigorous agitation.

8. The method of claim 7 wherein the resulting spherical particles are heated to a temperature of at least 350° C.

9. The method of claim 7 wherein the resulting spherical particles are heated to a temperature of at least 1200° C. in a reducing atmosphere.

References Cited in the file of this patent

UNITED STATES PATENTS

| | | |
|---|---|---|
| 2,551,543 | Mohr | May 1, 1951 |
| 2,764,470 | Richardson et al. | Sept. 25, 1956 |
| 2,770,521 | Spiegler | Nov. 13, 1956 |

FOREIGN PATENTS

| | | |
|---|---|---|
| 696,022 | Great Britain | Aug. 19, 1953 |
| 1,005,944 | Germany | Apr. 11, 1957 |

OTHER REFERENCES

Mogg et al.: A.E.C.D., 4103, 42 pages, July 8, 1946.
Wirths et al.: "2nd Geneva Conference on Paceful Uses of Atomic Energy," vol. 4, pp. 16–21 (1958).